United States Patent [19]

Bergthaller, et al.

[11] 4,186,014

[45] Jan. 29, 1980

[54] LIGHT SENSITIVE PHOTOGRAPHIC MATERIAL CONTAINING A MORDANT LAYER

[75] Inventors: Bergthaller, Peter, Cologne; Wulf von Bonin, Leverkusen; Günter Helling, Siegburg; Paul Marx, Leverkusen, all of Fed. Rep. of Germany

[73] Assignee: Agfa-Gevaert Aktiengesellschaft, Fed. Rep. of Germany

[21] Appl. No.: 814,148

[22] Filed: Jul. 11, 1977

[30] Foreign Application Priority Data

Jul. 14, 1976 [DE] Fed. Rep. of Germany ....... 2631521

[51] Int. Cl.² .................. G03C 1/40; G03C 5/54; C08F 18/24; B44D 1/09
[52] U.S. Cl. ................................. 430/213; 428/423; 428/425
[58] Field of Search ............ 96/3, 29 D, 77, 84 A, 96/114, 119 R; 101/464; 428/423, 424, 425; 260/77.5 Q, 77.5 CH, 77.5 B, 77.5 C

[56] References Cited

U.S. PATENT DOCUMENTS

| | | | |
|---|---|---|---|
| 2,983,606 | 5/1961 | Rogers | 96/3 |
| 3,877,945 | 4/1975 | Rosenhahn et al. | 96/77 |
| 3,991,026 | 11/1976 | Matsuda et al. | 260/77.5 Q |

FOREIGN PATENT DOCUMENTS 1487913 10/1977 United Kingdom .

*Primary Examiner*—Richard L. Schilling
*Attorney, Agent, or Firm*—Connolly & Hutz

[57] ABSTRACT

A suitable mordanting polymer for the image receiving layer in a color photographic material for the dye diffusion transfer process is a water-soluble cationic polymer containing glycidyl groups. Such polymers can be made by quaternizing a basic polyurethane, polyurea or polyurea polyurethane of the formula $$-[-A-B-]-$$

with a quaternizing agent capable of introducing glycidyl groups.

The recurring unit contains a quaternizable tertiary amino group, and the recurring unit B is derived from a bis-chloroformate or a diisocyanate.

2 Claims, No Drawings

LIGHT SENSITIVE PHOTOGRAPHIC MATERIAL CONTAINING A MORDANT LAYER

BACKGROUND OF THE INVENTION

This invention relates to an image receiving layer for the dye diffusion transfer containing a mordant which consists of a crosslinked reaction product of a water-soluble cationic polymer having recurrent units containing a quaternary nitrogen atom and carrying free glycidyl groups.

Such image-receiving layer may be coated onto a support layer and may be part of a light-insensitive image receptor sheet whic is to be contacted for development with a light-sensitive element comprising at least one light-sensitive silver halide emulsion layer and an associated dye-giving compound capable of releasing on development an imagewise distribution of a diffusible dye. Alternatively such image receiving layer may also be an integral constituent of a monosheet material comprising a light-sensitive element and an image receptor element.

It is well known in the field of photography to use various polymers as mordants for the mordant layers of photographic materials which are composed of a support layer, at least one silver halide emulsion layer, at least one layer which produces an image dye and is in contact with said silver halide emulsion layer, and a so-called integrated image receiving layer. Polymers suitable for the preparation of mordant layers have been described, for example, in U.S. Pat. No. 3,709,690; these polymers are obtained by the quaternisation of a polymer which contains tertiary nitrogen atoms with an alkylating agent or aralkylating agent.

Water insoluble polymers which are prepared by the reaction of polymers containing chloromethyl groups with tertiary amines and which can be crosslinked as described in U.S. Pat. No. 3,859,096 have been described as mordants in German Offenlegungsschrift No. 2,445,782. One disadvantage of using such mordants in instant image photography is that the mordanted image dyes tend to migrate from the image areas into non-image areas. This migration of dye, which is due to the fact that the mordant does not fix the dye firmly enough, results in reduced colour densities and chromatic fringes, particularly if the moisture content is high.

A further disadvantage of the mordants described in German Offenlegungsschrift No. 2,445,782, is that when image dyes which have been mordanted on these substances are exposed to sunlight, they undergo bleaching to a greater degree than in the unmordanted state and the overall light resistance of dye images obtained on such mordants is low. Furthermore, the use of water insoluble polymers as mordants for the preparation of mordant layers gives rise to particular difficulties if gelatine is used as binder. Water soluble polymeric mordants having molecular weights above 50,000 cause an undesirable increase in viscosity in aqueous solution due to their high content of quaternary ammonium groups.

Cationic polyurethanes have been mentioned as mordants for anionic organic compounds, in particular dyes, for example in German Offenlegungsschrift No. 2,315,304. The polymers described in the said document have average molecular weights of between 10,000 and 60,000 depending on the stoichiometric proportions of the reactants used for their preparation.

Mordants of this kind are generally unsuitable for the purposes of this invention. Although they are sufficiently resistant to diffusion if they have average molecular weights above 20,000, they either fail to take up the dye from the alkaline processing medium or take it up too slowly. With average molecular weights below 20,000, their dye absorption capacity is satisfactory but they have insufficient resistance to diffusion for the purposes of the invention.

SUMMARY OF THE INVENTION

It was an object of this invention to provide suitable diffusion resistant polymers for the preparation of mordant layers, which polymers would be able to fix the image dyes transferred to the mordant layer so that no migration of the image dyes could take place and dye images of increased density and light fastness would be obtained.

It was found that polymeric mordants combining very high dye absorption capacity with very high diffusion resistance could be obtained by at least partial quaternisation of basic polycondensation products or polyaddition products such as polyurethanes, polyureas or polyurea polyurethanes with quaternising agents which are suitable for the introduction of glycidyl groups. For reasons which are not known in detail, these cationic mordants have the additional effect of improving the light fastness of dyes mordanted on them.

The basic polyaddition products or polycondensation products on which the quaternary salts are based consist to an extent of 70 mol-% or more of recurrent units of the general formula

The element A is derived from a diol, hydroxy alkylamine or diamine containing at least one tertiary amino group by removal of two terminal hydrogen atoms and it corresponds to the general formula

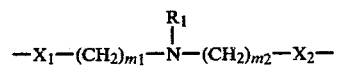

wherein the given groups and indices have the following meaning:

$R_1$ represents individually or in any combination, alkyl, in particular an alkyl group with 1–4 carbon atoms which may be branched, alkoxyalkyl, aralkyl, in particular benzyl, a disubstituted amino alkyl group of the formula

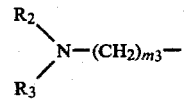

or an ethylene group which is attached to $X_1$ or $X_2$ through the second bond with formation of a piperazine ring and which may be substituted by a methyl group, $R_2$ and $R_3$: which may be the same or different represent alkyl groups having from 1–4 carbon atoms or together the atoms required to complete a pyrrolidine, piperidine or morpholine ring, $X_1$ and $X_2$: which may be the same or different represent —O—, —NH—, —NR$_4$— or a group of the formula —NR$_4$—(CH$_2$)$_{m4}$—X$_3$— in which R$_4$ represents a lower alkyl group having from 1–4 carbon atoms or, when only one of the groups $X_1$ and $X_2$ is NR$_4$—(CH$_2$)$_{m4}$—X$_3$, R$_4$ may together with R$_1$ form an ethylene group which may be substituted by methyl;

$X_3$ represents —O—, —NH— or —NR$_4$13 and may be the same as, or different from $X_1$ and $X_2$; the numerical indices have the following values:

$m_1$–$m_4$: may represent 2 or 3 but in the case of $m_1$ or $m_2$ only the value 2 may occur when R$_1$ and R$_4$ together form an ethylene group.

The element B is derived from a bis-chloroformate, a diisocyanate or an isocyanate prepolymer having two terminal isocyanate groups. Element B accordingly is represented by the general formula

—CO—Y—CO— in which

Y represents, individually or in combination, —O—R$_5$—O— or —NH—R$_6$—NH, or —NH—R$_6$—NH—CO—OR$_7$O—CO—NH—R$_6$—NH—

R$_5$ represents individually or in combination, an alkylene group which may be substituted by alkyl or interrupted by ether groups, R$_6$ represents individually or selectively in combination, an optionally alkyl-substituted alkylene group, e.g. a hexamethylene or trimethylhexamethylene group, a cycloalkylene group, e.g. a 1,4-cyclohexylene group, a 2-methyl-1,3-cyclohexylene group, a 4-methyl-1,3-cyclohexylene group, an arylene group, e.g. a 1,4-phenylene group, a 1,3-phenylene group, a 2-methyl-1,3-phenylene group or a 4-methyl-1,3-phenylene group, one of the following groups

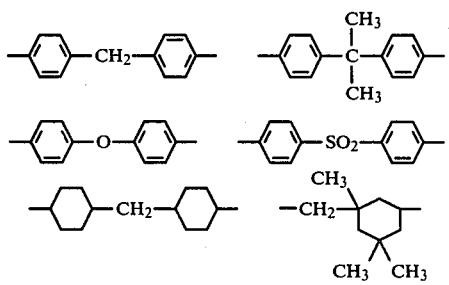

R$_7$ represents any divalent group not containing any other Zerewitinoff active group or group capable of reacting with isocyanate groups, in particular an alkylene group which may be substituted with one or more alkyl groups or interrupted by ether bonds but with the restriction that Y: can represent —OR$_5$—O— only when $X_1$ to $X_3$ are not —O—.

The groups A which occur repeatedly in the polymer according to the invention need not necessarily be the same, but may have differing structures within the given definitions if suitable mixtures of starting materials are used. The same applies, of course, to the groups B which alternate with A in the polymer.

The remainder of the structure of the basic starting polymer, which may constitute up to 30 mol-% of the polymer, consists of groups which are derived from modifying monofunctional or trifunctional alcohols and/or amines and/or isocyanates. Such modifying compounds may be for example: methanol, ethanol, 2-methoxyethanol, trimethylolpropane, pentaerythritol, triethanolamine, tris-2-hydroxypropylamine, phenylisocyanate, butyl isocyanate, cyclohexylisocyanate.

In addition to epichlorohydrin and/or other quaternising agents used according to the invention for the introduction of glycidyl groups, such as 1,3-dichloropropanol -2 or methane sulphonic acid-(2,3-epoxy)-propyl ester, other quaternising agents may also be used, for example the following:

(a) lower alkyl halides, in particular chlorides, e.g. methyl chloride, ethyl chloride, allyl chloride, propinyl chloride, 2-methoxyethyl cloride, chloroethanol;

(b) aralkyl halides, in particular benzyl chloride;

(c) alkane sulphonic acid alkyl esters, in particular those having alkyl groups with not more than 4 carbon atoms and preferably unbranched alkyl groups, e.g. methane sulphonic acid ethyl ester or methane sulphonic acid-(2-methoxy)-ethyl ester;

(d) dialkylsulphates such as dimethylsulphate or diethylsulphate;

(e) trialkyl phosphates;

(f) alkyl esters of aromatic sulphonic acids;

(g) trialkyl oxonium salts, e.g. triethyl oxonium tetrafluoroborate;

(h) α-monohalocarboxylic acid esters or amides such as chloroacetic acid esters or chloroacetamides.

DETAILED DESCRIPTION

It will readily be seen by the man of the art that relatively high molecular weight cationic polyurethanes or polyureas need only be quaternised to a slight oxtent with epichlorohydrin or any other quaternising agent for the introduction of glycidyl groups in order to be sufficiently diffusion resistant. The lower the molecular weight of the basic polyurethane or basic polyurea, the higher should generally be the proportion of epoxide used, but even with average molecular weights of about 1,000 a degree of quaternisation with epichlorohydrine of 40% is quite sufficient. The remaining quaternisable nitrogen atoms will then either be quaternised with one of the other quaternising agents indicated above or neutralised with an acid.

Oligourethanes containing quaternary salt groups according to the invention are already known as paper sizes, e.g. according to U.K. Pat. No. 1,487,913 or in German Offenlegungsschrift No. 2 537 653. The starting materials used for perparing cationic mordants which are suitable for the purposes of the invention may be amines having at least one tertiary nitrogen atom and two groups capable of reaction with an isocyanate group. Amines of this kind are well known in the chemistry of polyurethanes and polyureas. Reference may be had in this connection to the relevant chapter in Houben-Weyl, Volume 14, Part 2, pages 57 to 98 and 165 to 171.

The following are specific examples: Bis-2-hydroxyalkyl-alkylamines, aminoalkyl-hydroxyalkyl-alkylamines, alkylaminoalkyl-hydroxyalkyl-amines, bis-aminoalkyl-alkylamines, bis-alkylaminoalkyl-alkylamines, bis-hydroxyalkyl-aralkylamines, aminoalkyl-hydroxyalkyl-alkylamines, alkylaminoalkyl-hydroxyalkyl-aralkylamines, bis-aminoalkyl-aralkylamines, bis-alkylaminoalkyl-aralkylamines, bis-hydroxyalkyl-piperazines, bis-aminoalkyl-piperazines, bis-alkylaminoalkyl-piperazines, hydroxyalkyl-aminoalkyl-piperazines, hydroxyalkyl-alkylaminoalkyl-piperazines, addition products of ethylene oxide or methylaziridine with aminoalkyl-piperidine, aminoalkyl-pyrrolidines or aminoalkyl-morpholines, addition products of ethylene oxide with N,N'-dialkyl-aminoalkanes or N,N', N"-trialkyl-dialkylene triamines.

The following starting materials are also required for the cationic mordants according to the invention: bis-chloroformates or diisocyanates; also polyisocyanates suitably controlled by means of monofunctional chain-breaking agents.

Any of the polyisocyanates known in polyurethane chemistry may, in principle, be used for preparing the oligourethanes, for example those mentioned in Kunststoff-Handbuch, Volume VII, Polyurethane, Carl Hanser Verlag Münich (1966) or by W. Siefken in Justus Liebig's Annalen der Chemie, 562, pages 75–136.

Examples of suitable polyisocyanates include hexamethylene diisocyanate, dodecamethylene diisocyanate, cyclohexane-1,3-diisocyanate, cyclohexane-1,4-diisocyanate, 1-isocyanato-3,3,5-trimethyl-5-isocyanatomethyl-cyclohexane commonly known as isophorone diisocyanate, 2,4- and 2,6-hexahydrotolylene diisocyanate and any mixtures of these isomers, 2,4- and 2,6-tolylene diisocyanate and any mixtures of these isomers, diphenylmethane-2,4'- and/or -4,4'-diisocyanate, 2,4-diisocyanato-diphenyl ether, polyphenyl-polymethylene polyisocyanates which can be obtained by aniline-formaldehyde condensation followed by phosgenation and which have been described, for example, in British Pat. Nos. 874,430 and 848,671, polyisocyanates having carbodiimide groups as described in German Pat. No. 1,092,007, polyisocyanates having allophanate groups as described, for example, in British Pat. No. 994,890, polyisocyanates having isocyanurate groups as described e.g. in U.S. Pat. No. 3,001,973 and in German Pat. Nos. 1,022,789; 1,222,067 and 1,027,394 and polyisocyanates having urethane groups as described e.g. in Belgian Pat. No. 752,261 or in U.S. Pat. No. 3,394,164.

Sufficiently detailed information on the preparation of the corresponding basic polyurethanes or ureas and their quaternisation may be found in German Offenlegungsschriften Nos. 1,472,746; 1,522,387 and 2,315,304. The corresponding polyureas are basically prepared in a similar manner but the process is simplified by the fact that protic solvents such as ethanol or isopropanol may also be used without any special restrictions. The average molecular weight $\overline{M}$ of the basic polymers used as starting materials should, for the purposes of the invention, not exceed 20,000. This can easily be ensured by suitable choice of the molar ratio of the reactants or by the addition of monofunctional compounds such as monoamines, monohydric alcohols or monoisocyanates or esters or by the addition of water or monocarboxylic acids to the reaction medium. If the molecular weights obtained in building up the polymer structure are too high, the viscosity obtained after quaternisation will reach unacceptable values. If the average molecular weight of the basic polymer used as starting material is kept within the range of 500 to 4,000 as described in U.K. Application No. 34779/76 the necessary resistance to diffusion can easily be obtained by quaternisation with a correspondingly higher proportion of glycidyl groups. The low molecular weight compounds obtained are then characterised by exceptionally advantages viscosity values in solution even at high concentrations and they acquire their final diffusion resistant state by internal crosslinking or crosslinking with the binder after drying. In addition, this has an advantageous effect on the adherence and cohesiveness of the layer.

The cationic mordants according to the invention are advantageously prepared from basic polyurethanes or polyureas having an average molecular weight below 20,000, most preferably below 10,000. The cationic mordants according to the invention are characterised by exceptionally high dye absorption capacity with a maximum in the slightly acid to neutral range, which is very marked in compounds having a comparatively high average molecular weight. This may have the result that dye absorption in the mordanting layer mainly takes place only when the pH has been adjusted to a value below 8 by an incorporated neutralisation system or by some other means. In mordants according to the invention which are derived from basic polymers having a lower average molecular weight (e.g. below 10,000), the maximum of the dye absorption capacity is less strongly marked.

These mordants therefore have a high dye absorption capacity over a much wider pH range and hence have an efficient mordanting action even in the more strongly alkaline range.

Conversion of the oligourethanes, oligoureas, polyurethanes or polyureas into mordants containing quaternised or partially quaternised and protonised ammonium groups may be carried out during or after the polyaddition reaction. Thus, for example, instead of using alkanolamines in the isocyanate reaction, the reaction products of the alkanolamines with quaternising agents of the kind given as examples below may be used at this stage. Alternatively, the quaternising agents may be added as mixtures with the polyisocyanate so that the isocyanate addition reaction is accompanied by quaternisation of tertiary nitrogen atoms. Lastly, quaternisation of the oligourethanes in organic solution may, of course, be carried out after completion of the isocyanate polyaddition reaction. Protonisation of the oligourethanes with acids of which examples are given below, which may be carried out in addition to or instead of quaternisation, may also be effected either before or after the isocyanate polyaddition reaction, by either carrying out the reaction between alkanolamine and polyisocyanate in the presence of carboxylic acids such as formic or acetic acid or adding a suitable acid to the oligourethane after its preparation. In this way, the addition of acetic acid not only accelerates the reaction but also results in a low viscosity of the reaction products. The acids may be added in quantities of from 0 to 30% by weight, preferably 1 to 15% by weight, based on the total weight of the reaction mixture.

In the special case of preparation of suitable starting polymers from triamines containing a tertiary nitrogen atom and bis-chlorocarbonic acid esters by interface polycondensation, quaternisation is, of course, carried out in a separate stage after completion of the polycondensation reaction. If quaternisation were carried out simultaneously in this case, it would lead to premature consumption of the amino end groups.

The quaternising agents used for preparation of the mordants according to the invention may in principle be any quaternising substances which do not unduly lower the solubility of the products of quaternisation in an aqueous medium. It is therefore preferred to use quaternising agents which have not more than 10 carbon atoms. Apart from sulphates, and sulphonates, such quaternising agents include in particular compounds containing activated halogen, e.g. benzyl chloride, propyl chloride, allyl chloride, ethyl chloride, methyl chloride, dichloropropene, dichlorobutane, chloropropyne or dichloroethane or epoxides such as cyclohexene oxide, butane oxides, propylene oxide, ethylene oxide or epichlorohydrin; also chloroacetamide, ethylchloroacetate, chloroacetic acid dimethylamide or ethylene chlorohydrin. In addition to dialkyl sulphates, epichlorohydrin is particularly preferred on account of its efficiency and the ease with which it can be handled. The most suitable acids for protonising the oligourethanes are medium-strong, readily volatile acids such as formic acid or acetic acid. Inorganic acids such as hydrochloric acid, sulphuric acid or phosphoric acid are also suitable but less advantageous.

The preferred mordants according to the present invention are those in which from 10 to 100%, preferably 40 to 100% of the tertiary nitrogen atoms are in the quaternised form. In the mordants according to the invention, the incompletely quaternised compounds often contain tertiary ammonium ions in addition to the quaternised nitrogen atoms since it was found to be suitable to adjust the pH of the mordants to about 5 to 7 by the addition of acids.

Preparation of the basic polymers used as starting materials is carried out at temperatures of from 0° to 150° C., preferably at 20° to 90° C., optionally under conditions of refluxing the solvent or cooling or heating. Quaternisation is carried out at from 25° to 120° C., preferably at 50° to 90° C. All the operations are preferably accompanied by vigourous stirring to ensure thorough mixing of the reactants. The process may be carried out continuously or discontinuously.

After completion of the reaction, the desired quantity of water may be added to the predominantly organic solution of the mordant, and part or all of the organic solvent may, if desired, by removed at the same time or subsequently. Solutions having a solids content of from 5 to 75% by weight, preferably 20 to 50% by weight, which are capable of being diluted with water can be obtained in this way.

The mordants according to the invention are water soluble and preferably used in mordant layers of colour photographic materials for the dye diffusion transfer process. For this purpose, they are cast to form a mordant layer, optionally in combination with a conventional, preferably hydrophilic binder, this layer constituting a component of an image receptor sheet or an integral constituent of a monosheet material comprising a light sensitive element and an image receptor element. The binder, if used, is preferably gelatine. The mordant layer preferably contains the cationic polymeric mordants according to the invention in quantities of from 10 to 70% by weight, based on the total solids content of the mordant layer.

Other hydrophilic, film-forming polymers of natural or synthetic origin may be used as binders apart from gelatine, for example the following: gum arabic, albumen, casein, dextrine, starch ethers or cellulose ethers, polyvinyl alcohol, succinoylated polyvinyl alcohol, partially phthaloylated polyvinyl alcohol, polyacrylamide and copolymers of acrylic acid, vinyl imidazole, vinyl pyrrolidone, hydroyethyl acrylamide, vinyl pyridine, maleic acid or maleic acid anhydride with acrylamide.

This selection is, of course, given only by way of example and in no way restricts the invention. During drying of the image receiving layer at least part of the free glycidyl groups of the freshly prepared mordanting polymer are consumed by internal crosslinking or crosslinking with the binder as mentioned above. Therefore the mordanting polymer in its final state as it is present in the dried image-receiving layer may actually have only a small content of free clycidyl groups, if any. This state is referred to herein as "crosslined reaction product" of the polymer containing glycidyl groups.

The light sensitive element with which the image receptor element is contacted for development or which together with the image receptor element forms an integral constituent of a so-called monosheet material comprises at least one light-sensitive silver halide emulsion layer and associated to it at least one dye-giving compound.

For dye-giving compounds and related dye diffusion transfer processes for the production of colored transfer images reference may be made for example to one of the following publications: DT-PS 1,095,115, DT-OS 1,930,215, DT-OS 1,772,929, DT-OS 2,242,762, DT-OS 2,505,248, DT-OS 2,543,902, DT-OS 2,645,656, and Research Disclosures No. 15 157 (November 1976) and 15 654 (April 1977).

PREPARATION OF THE COMPOUNDS

EXAMPLE 1

A solution of 400 g of 4,4-diphenylmethane diisocyanate and 90 g of epichlorohydrin in 1000 ml of methylene chloride is combined with a solution of 150 g of N-ethyl-diethanolamine in 300 ml of isopropanol with vigorous stirring in a flask with distillation attachment. The methylene chloride is then distilled off and the contents of the flask are kept at 80° C. for four hours. The residue is taken up with 50 g of acetic acid in 1,900 ml of water at a temperature below 50° C. The solution is a thin liquid with a solids content of 25%.

EXAMPLE 2

0.7 mol of hexamethylene diisocyanate in 100 ml of ethyl acetate is added dropwise with stirring to 1 mol of N-butyldiethanolamine at 70°–80° C. The temperature is kept at 80° C. for one hour, 0.28 mol of 2,2-bis-(4-isocyanatophenyl)-propane in 200 ml of ethyl acetate is added dropwise and 250 ml of ethyl acetate are distilled off. The temperature is then kept at 80° C. for another 2 hours and 300 ml of ethanol are added. 0.8 mol of diethyl sulphate and 0.1 mol of epichlorohydrin are added dropwise within one hour at 75° C. Quarternisation is completed by heating the mixture for 4 hours at 70°–75° C. The polymer is then precipitated with 2000 ml of acetone and taken up in 500 ml of methanol. The total volume is adjusted to 2000 ml with distilled water.

EXAMPLE 3

The procedure is the same as in Example 2 except that hexamethylene diisocyanate is replaced by an equimolar quantity of isophorone diisocyanate.

EXAMPLE 4

The procedure is the same as in Example 2 except that a mixture of 0.85 mol of N-butyl-diethanolamine and 0.15 mol of N-methyl-diethanolamine is used instead of 1 mol of N-butyl-diethanolamine. In addition, 0.1 mol of epichlorohydrin are added for quarternisation after the addition of ethanol. The solution is kept at 70° C. for one hour and 0.8 mol of diethyl sulphate are then added in the course of one hour. The solution is kept for a further three hours at 70° C. and finally made up to a volume of 2000 ml with water.

EXAMPLE 5

The procedure is the same as described in Example 2 except that a mixture of 0.5 mol of N-butyl-diethanolamine and 0.5 mol of N-ethyl-diethanolamine is used instead of N-butyl-diethanolamine alone. In addition, the reaction mixture is quaternised for one hour at 65° C. after the addition of ethanol and 0.2 mol of epichlorohydrin. After the addition of 0.65 mol diethyl sulphate over a period of one hour at 65° C., stirring is continued for a further three hours at 65° C. and the volume is adjusted to 2000 ml by the addition of distilled water and 300 ml of ethanol.

EXAMPLE 6

A brownish coloured mixture of about 80% of N-(3-morpholinopropyl)-diethanolamine and about 20% of N-(3-morpholinopropyl)-ethanolamine is prepared by introducing ethylene oxide into 1 mol of N-(3-aminopropyl)-morpholine at 130° C. The mixture can be used without further purification. It is dissolved in 200 ml of ethylglycol acetate and 0.95 mol isophorone diisocyanate are added to the resulting solution at 75° to 90° C. with vigorous stirring. The temperature is kept at 80° to 90° C. for a further hour and 300 ml of ethanol are then added. Stirring is continued until a homogeneous solution is obtained and 0.2 mol of epichlorohydrin are then added dropwise over a period of 30 minutes at 65° C. The reaction mixture is heated to 75° C. for two hours and 1.2 mol of diethyl sulphate are then added over a period of thirty minutes. The temperature is kept at 70° C. for another two hours, 300 ml of ethanol are added and the total volume is made up to 2000 ml with distilled water. The pH is adjusted to 6 with 10 ml of acetic acid.

EXAMPLE 7

A crude preparation of bis-hydroxyethyl-N,N'-dimethyl-ethylene diamine containing 80% of the bis-hydroxyethyl compound and about 15% of the monohydroxy ethyl compound is obtained by reacting 0.5 mol of N,N'-dimethyl-ethylene diamine with 1 mol of ethylene oxide at 120° C. under pressure. 0.5 mol of butyl diethanolamine is then added, followed by dropwise addition of 0.93 mol of hexamethylene diisocyanate in 200 ml of ethylglycol acetate at 80° C. The temperature is kept at 80° C. for another two hours and then reduced to 60° C. by the addition of 300 ml of cold ethanol. The mixture is then quaternised with 0.25 mol of epichlorohydrin at 65° C. for two hours. A total of 1 mol of diethyl sulphate is then added portionwise and the temperature is kept at 65° to 70° C. for a further three hours. After the addition of 300 ml of methanol and adjustment of the pH to 6.0 with glacial acetic acid, the total volume is made up to 2000 ml with distilled water.

EXAMPLE 8

0.5 mol of methyl diethanolamine and 0.5 mol of N-hydroxyethyl piperazine are dissolved in 300 ml of isopropanol. 0.8 mol of hexamethylene diisocyanate in 150 ml of ethylglycol acetate is added dropwise at 65° to 70° C. 0.25 mol of 4,4'-diphenylmethane-diisocyanate in 150 ml of ethylglycol acetate is added after one hour and the reaction mixture is kept at 95° C. on a steam bath for forty minutes. It is then diluted with 400 ml of methanol and after the addition of 0.5 mol of epichlorohydrin and 0.3 mol of diethyl sulphate the temperature is kept at 60°–65° C. for five hours. The total volume is then made up to 2000 ml with distilled water. The pH is adjusted to 5.8 with 15 ml of glacial acetic acid.

EXAMPLE 9

The procedure is the same as in Example 8 but using 0.5 mol of N,N',N''-trimethyl-diethylene triamine instead of 0.5 mol of hydroxyethylpiperazine. The reaction is carried out at 60°–70° C. in 600 ml of isopropanol. No methanol is added.

EXAMPLE 10

The procedure is the same as in Example 8 but a total of 1.1 mol of isophorone diisocyanate in 250 ml of ethylglycol acetate is added instead of 0.8 mol of hexamethylene diisocyanate and 0.25 mol of diphenylmethane diisocyanate.

EXAMPLE 11

0.55 mol of isophorone diisocyanate are added to a solution of 0.7 mol of N-butyl-diethanolamine in 300 ml of ethylglycol acetate at 75° C. over a period of 40 minutes. 0.3 mol of bis-(3-aminopropyl)-methylamine are then added and 0.4 mol of isophorone diisocyanate are subsequently added dropwise over a period of one hour. The temperature is kept at 80° C. for another hour, 0.3 mol of epichlorohydrin are added and the solution is diluted with a total of 400 ml of methanol until it becomes heterogeneous. The solution is then requaternised in 0.5 mol of diethyl sulphate at 70° C. for three hours and made up to 2000 ml with a 1:1 mixture of ethanol and water.

EXAMPLE 12

0.9 mol of isophorone diisocyanate in 400 ml of dichloromethane is added dropwise at 50° C. to a solution of 1 mol of bis-(3-aminopropyl)-methylamine in 400 ml of methylglycol. About 400 ml of dichloromethane are then distilled off and at the same time 400 ml of methylglycol are added. 0.4 mol of epichlorohydrin and 0.4 mol of diethylsulphate are added over a period of two hours for quaternisation. The temperature is kept at 60° C. for a further 30 minutes and the volume is then made up to 2000 ml with water. The solution is stored at a temperature below 10° C. until required for use.

EXAMPLE 13

A basic polymer is prepared as starting material from 1 mol of N-butyl-diethanolamine and 0.9 mol of isophorone diisocyanate in 200 ml of ethyl acetate. The polymer is introduced into a chilled autoclave and 0.6 mol of chloromethane in 250 ml of methanol which has been precooled to −40° C. is added. The autoclave is kept at 110°–120° C. for four hours and then cooled and the pressure is released. 0.4 mol of epichlorohydrin in 200 ml of methanol is then added. The autoclave is heated to 90°–95° C. for 30 minutes and cooled and the viscous solution is diluted with a 1:1 mixture of water and methanol to make the volume up to 2000 ml.

EXAMPLE 14

The procedure is the same as in Example 2 except that instead of 0.7 mol of hexamethylene diisocyanate, the equimolar quantity of a commercial mixture of 1- methyl-2,4-diisocyanato-cyclohexane and 1-methyl-2,6-diisocyanato-cyclohexane (molar ratio 8:2) is used.

EXAMPLE 15

The procedure is the same as in Example 4 except that 0.7 mol of hexamethylene diisocyanate is replaced by an equimolar quantity of 4,4'-diisocyanto-dicyclohexyl methane.

EXAMPLE 16

1.0 mol of isophorone diisocyanate is dissolved in 2.2 mol of phenol at 95°–100° C. after the addition of 0.5 imidazole. The mixture is kept as a liquid by the addition of 200 ml of ethylglycol acetate. 0.9 mol of butyldiethanolamine are added after a reaction time of four hours and the mixture is then distilled at a reaction temperature of 120° C. to remove everything which distils off at a vacuum of 5 torr. The residue is then dissolved in 200 ml of ethylglycol acetate and 400 ml of ethanol and quaternised at 60°–70° C., first with 0.5 mol of epichlorohydrin for three hours and then with 0.5 mol of diethylsulphate. The readily soluble cationic polyurethane with phenylurethane end groups obtained in this way is made up to a volume of 2000 ml with methanol and then stored at temperatures below 10° C.

EXAMPLE 17

A prepolymer is prepared as in Example 16 from 2.2 mol of phenol, 0.5 g of imidazole, 1.0 mol of isophorone diisocyanate and 0.2 mol of trimethylol propane. After the addition of 200 ml of diglyme, the prepolymer is polymerised by reaction with 0.4 mol of bis-(3-aminopropyl)-methylamine and 0.4 mol of butyldiethanolamine at a reaction temperature of 120° C. Any phenol liberated is distilled off under a vacuum of 5 torr. The residue is quaternised with 0.2 mol epichlorohydrin for 1 hour at 70° C. and then with 0.3 mol of diethyl sulphate for three hours at 70° C. and made up to 1000 ml with methanol. The pH is adjusted to 5.5 with acetic acid.

EXAMPLE 18

0.5 mol of N-hydroxyethyl-N'-(3-aminopropyl)-piperazine and 0.6 mol of butyldiethanolamine are successively reacted with 0.5 mol of trimethylhexamethylene diisocyanate (commercial mixture) and 0.5 mol of hexamethylene diisocyanate under solvent-free conditions at 90° C. The polyurea polyurethane obtained is dissolved in carbitol and quaternised at 95° C. for 30 minutes, first with 0.3 mol of epichlorohydrin and then with 0.6 mol of diethyl sulphate. The solution is made up to 2000 ml with methanol and diluted with the same volume of water for use.

EXAMPLE 19

A prepolyamide prepared solvent-free at 170° C. from 1.0 mol of bis-(3-aminopropyl)-methylamine and 0.4 mol of dimethyl glutarate with removal of methanol by distillation is dissolved in dioxane (200 ml) and polymerised by reaction with 0.55 mol of isophorone diisocyanate at 95° C. The viscosity remains constant after two hours. The reaction mixture is then diluted with methylglycol (200 ml) and quaternised with a mixture of 0.4 mol of epichlorohydrin and 0.5 mol of methane sulphonic acid-β-methoxyethyl ester for three hours at 80° C. The volume is then made up to 2000 ml with water.

EXAMPLE 20

A solution of 110 g of potassium hydroxide in 300 ml of water is introduced as a lower layer under a solution of 1 mol of bis-(3-aminopropyl)-methylamine in 1000 ml of dichloromethane. A total of 0.9 mol of freshly prepared ethylene glycol bis-chloroformate is then added to the top layer with vigorous stirring, first at −20° C. and then at 0° C. The organic layer is separated from the layer of salt and evaporated under vacuum. The residue is dissolved in 400 ml of ethanol and quaternised by dropwise addition of 0.3 mol of epichlorohydrin and 0.6 mol of diethyl sulphate over a period of four hours at 60° to 65° C. The volume is then made up to 2000 ml with water.

EXAMPLE 21

Example 20 is repeated but with the difference that, instead of bis-3-aminopropyl-methylamine, an equimolar quantity of N,N',N''-trimethyl-diethylene diamine is used.

EXAMPLE 22

Example 21 is repeated but with the difference that quaternisation is initially carried out with 0.7 mol of chloromethane in a pressure vessel at 95° C. and the reaction product is subsequently requaternised with 0.2 mol of epichlorohydrin for two hours at 75° C.

EXAMPLE 23

A basic polymer used as starting material is prepared from N-propyl-diethanolamine (1.0 mol) and isophorone diisocyanate (0.9 mol) in ethylglycol acetate (200 ml) at 90° C. After dilution with 200 ml of methylglycol, the polymer is quaternised, first with 0.5 mol of chloroacetamide at 100° C. for four hours and then with 0.3 mol of epichlorohydrin at 70° C. for six hours. The reaction mixture is neutralised and finally adjusted to pH 6 with glacial acetic acid. The volume is made up to 2000 ml by dilution with a 1:1 mixture of water and methanol.

WORKING EXAMPLE 1

A light sensitive element of a photographic material according to the invention was prepared by applying the following layers in succession to a transparent polyester support. The quantities given refer to 1 m$^2$.

(1) A mordant layer of 3.6 g of octadecyltrimethyl ammonium methyl sulphate and 9.0 g of gelatine.

(2) A reflection layer of 48 g of $TiO_2$ and 4.8 g of gelatine.

(3) A carbon black layer of 1.9 g of carbon black and 2 g of gelatine.

(4) A dye layer of 1.6 g of compound I (cyan) and 2.2 g of gelatine.

(5) A red sensitised emulsion layer containing an unfogged direct positive silver chlorobromide emulsion, silver application 2.0 g, gelatine 1.8 g.

(6) A barrier layer of 0.26 g of octadecyl hydroquinone sulphonic acid and 2.26 g of gelatine.

(7) A dye layer of 0.94 g of compound II (magenta) and 2.85 g of gelatine.

(8) A green sensitised emulsion layer containing an unfogged direct positive silver chlorobromide emulsion, silver application 2.0 g, gelatine 1.8 g.

(9) A barrier layer identical to layer 6.

(10) A dye layer of 1.48 g of compound III (yellow) and 2.85 g of gelatine.

(11) A blue sensitised emulsion layer containing an unfogged direct positive silver chlorobromide emulsion, silver application 2.0 g, gelatine 1.8 g.

(12) A protective layer of 2.6 g of gelatine.

(13) A transparent cover sheet of polyethylene terephthalate containing a neutralising layer and a retarding layer.

After exposure through a step wedge, the transparent cover sheet was placed on the light sensitive side of the light sensitive element. The developer liquid used for developing the light sensitive element after imagewise exposure was contained in a container which was designed to be split open. This liquid had the following composition:

60 g of potassium hydroxide
10 ml of benzylalcohol
1 g of paraformaldehyde
3 g of benzotriazole
0.25 g of ascorbic acid
1.3 g of 1-phenyl-4-methyl-4-hydroxymethyl-3-pyrazolidone
0.1 g of hydroquinone
30 g of Natrosol HHR 250 (hydroxyethyl cellulose)
made up to 1000 ml with water.

The film set was passed between a pair of squeezing rollers so that the developer paste was spread out between the light sensitive element and the cover sheet. The thickness of the layer of paste was 180μ. To adjust the layer to this thickness, spacer strips of suitable thickness were arranged along the edge of the film, between the light sensitive element and the cover sheet. A direct positive, multi-coloured copy of the original (film set A) was obtained after a development time of 10 minutes.

For comparison, a similar element prepared by the process described above was used, but in this case the mordant layer contained 6 g of a mordant according to Example 1 and 6 g of gelatine. A direct positive, multi-coloured copy of the original (film set B) was obtained by the same method of processing.

Another comparison element was prepared by the process described above, the difference in this case being that the mordant layer contained 6 g of a mordant according to Example 20 of German Offenlegungsschrift No. 2,315,304 and 6 g of gelatine. A direct positive, multi-coloured copy of the original (film set C) was again obtained by the same method of processing but the colour density was unsatisfactory.

The image quality of film sets A, B and C were then studied in more detail over a period of 8 days. Blurring and loss of colour density were observed in film set A after only a few hours. The effects were due to seeping of the mordanted dyes from the edges of the image and back diffusion of the dyes from the mordant layer as well as recrystallisation of the dyes in the mordant layer. The image quality of film set B was unchanged even after 8 days.

A progressive increase in colour density over the period of 8 days was observed in film set C. The true quality of the image can only be finally assessed after this time.

WORKING EXAMPLE 2

The process described in Working Example 1 was repeated except that the following layers were used: (a) a mordant layer of 6 g of a compound according to Example 2 and 6 g of gelatine (film set D), (b) a mordant layer of 3 g of a copolymer of styrene units and tri-n-octyl-N-vinylbenzyl ammonium chloride units and 6 g of gelatine (film set E).

Direct positive, multi-coloured copies of the original were obtained after the same method of processing as as in Example 1.

Film sets A, B, D and E developed according to Examples 1 and 2 were exposed to $4.8 \times 10^6$ lux. hours on a Xenon drum.

The following density losses were recorded:

| Film set A | yellow 55% | magenta 70% | cyan 73% |
| Film set B | yellow 15% | magenta 17% | cyan 32% |
| Film set D | yellow 7.4% | magenta 4% | cyan 13.5% |
| Film set E | yellow 31% | magenta 48% | cyan 31% |

It is clear from this that the mordants described according to the invention provide improved values for light fastness.

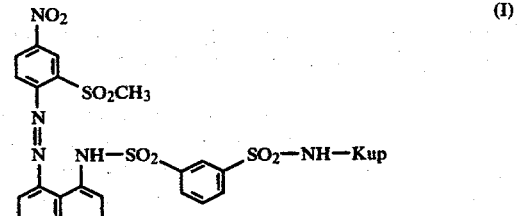

(I)

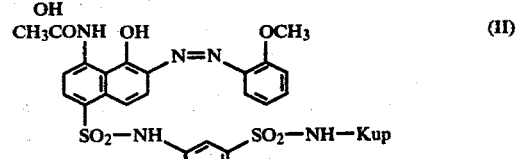

(II)

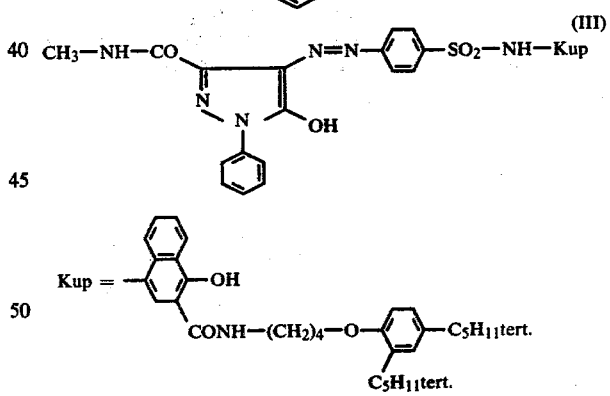

(III)

We claim:

1. An image receptor element for the dye diffusion transfer process comprising a support and an image-receiving layer containing as mordant a reaction product of a crosslinking reaction between
a hydrophilic gelatin binder and a water-soluble cationic polymer obtained from a basic polyurethane, polyurea or polyurea polyurethane consisting of from 0 to 30 mols % of recurrent units derived from a modifying monomer selected from the group consisting of monofunctional and trifunctional alcohols, amines, and isocyanates and from 70 to 100 moles % of recurrent units of the general formula $$[-A-B-]$$

in which segment A is derived from a diol, hydroxy alkylamine or diamine containing at least one tertiary amino group by removal of two terminal hydrogen atoms and corresponds to the general formula

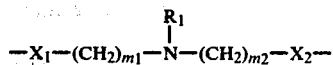

$R_1$ represents individually or in combination, straight or branched chain alkyl, alkoxyalkyl, aralkyl, a disubstituted aminoalkyl group of the formula

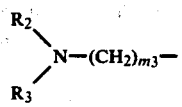

or an ethylene or 1,2-propylene group which is attached to $X_1$ or $X_2$ through the second bond with formation of a piperazine ring, $R_2$ and $R_3$ which may be the same or different represent alkyl groups selected from the group consisting of from 1 to 4 carbon atoms or together the atoms required to complete a pyrrolidine, piperidine or morpholine ring, $X_1$ and $X_2$ which may be the same or different, represent —O—, —NH—, —NR_4— or a group of the formula
—NR$_4$—(CH$_2$)$_{m4}$—X$_3$—
in which $R_4$ represents an alkyl group having from 1 to 4 carbon atoms or when only one of the groups $X_1$ or $X_2$ is —NR$_4$—(CH$_2$)$_{m4}$—X$_3$—, $R_4$ may together with $R_1$ form an ethylene or a 1,2-propylene group $X_3$ represents —O—, —NH— or —NR$_4$— and may be the same as or different from $X_1$ and $X_2$; and $m_1$ to $m_4$ represent 2 or 3, but in the case of $m_1$ or $m_2$ only the value 2 may occur when $R_1$ and $R_4$ together form an ethylene or 1,2-propylene group; and wherein segment A contains up to 40% of the tertiary amino group-quaternized with a quaternizing agent carrying glycidyl groups, and the remainder of the tertiary amino groups (i) quaternized with quaternizing agents absent glycidyl groups, or (ii) neutralized with an acid, and in which segment B is derived from a bis-chloroformate, a diisocyanate or an isocyanate prepolymer having two isocyanate end groups, and is represented by the formula $$-CO-Y-CO-$$

Y represents, individually or in combination, —O—R$_5$—O— —NH—R$_6$—NH— or —NH—R$_6$—NH—CO—O—R$_7$—O—CO—NH—R$_6$—NH—;

$R_5$ represents individually or in combination an alkylene group unsubstituted or substituted by alkyl group or interrupted by ether oxygen atoms;

$R_6$ represents individually or selectively in combination an alkylene group unsubstituted or substituted with alkyl groups, a cycloalkylene group or an arylene group;

$R_7$ represents any divalent group not containing any other Zerewitinoff active group or a group capable of reacting with isocyanate groups, provided that Y can represent —OR$_5$O only when $X_1$ or $X_3$ are not —O—.

2. A light-sensitive color photographic material comprising as integral constituents an image receptor element as claimed in claim 1 and a light-sensitive element containing at least one light sensitive silver halide emulsion layer and associated with said silver halide emulsion layer a non-diffusing dye-giving compound capable of releasing on development a diffusible dye in image distribution.

* * * * *